United States Patent [19]

Bower

[11] 4,376,283

[45] Mar. 8, 1983

[54] METHOD AND APPARATUS FOR USING A DISPOSABLE INK JET ASSEMBLY IN A FACSIMILE SYSTEM AND THE LIKE

[75] Inventor: Kenneth W. Bower, New Milford, Conn.

[73] Assignee: Exxon Research and Engineering Co., Florham Park, N.J.

[21] Appl. No.: 203,583

[22] Filed: Nov. 3, 1980

[51] Int. Cl.[3] .............................................. G01D 15/18

[52] U.S. Cl. .................................. 346/140 R; 346/75

[58] Field of Search .................. 346/140, 75; 358/296

[56] References Cited

U.S. PATENT DOCUMENTS

| | | | |
|---|---|---|---|
| 2,693,766 | 11/1954 | Seyler | 103/149 |
| 2,917,002 | 12/1959 | Mascaro | 103/149 |
| 3,111,897 | 11/1963 | Van Buskirk | 101/350 |
| 3,192,863 | 7/1965 | Vadot | 103/149 |
| 3,431,864 | 3/1969 | Jones | 103/149 |
| 3,482,258 | 12/1969 | Steen | 346/140 |
| 3,565,554 | 2/1971 | Muller | 417/477 |
| 3,597,124 | 8/1971 | Adams | 417/477 |
| 3,739,717 | 6/1973 | Brown et al. | 101/37 |
| 3,761,953 | 9/1973 | Helgeson et al. | 346/75 |
| 3,787,880 | 1/1974 | Kattner et al. | 346/75 |
| 3,909,831 | 9/1975 | Marchio et al. | 346/140 |
| 3,945,021 | 3/1976 | Kraus | 346/75 |
| 3,961,337 | 6/1976 | Jung | 346/140 R |
| 3,990,444 | 11/1976 | Vial | 128/214 F |
| 4,042,937 | 8/1977 | Perry et al. | 346/1 |
| 4,074,284 | 2/1978 | Dexter et al. | 346/140 R |
| 4,080,113 | 3/1978 | Legeay | 417/477 |
| 4,080,608 | 3/1978 | Stoneburner et al. | 346/75 |
| 4,123,761 | 10/1978 | Kimura | 346/1.1 |
| 4,131,399 | 12/1978 | Calvet | 417/477 |
| 4,162,501 | 7/1979 | Mitchell et al. | 346/140 R |

*Primary Examiner*—Stafford D. Schreyer

*Attorney, Agent, or Firm*—Norman L. Norris; Dale M. Heist

[57] ABSTRACT

An ink jet apparatus is disclosed which comprises a disposable ink reservoir and pumps for providing priming and purging to the ink jet and for providing subatmospheric pressure in the vicinity of the jet to collect any debris from the orifice of the jet prior to start up of the jet. In a preferred embodiment, both pumps are peristaltic and are powered by single motive means mounted permanently on a facsimile apparatus with which the disposable ink jet apparatus may be used.

11 Claims, 9 Drawing Figures

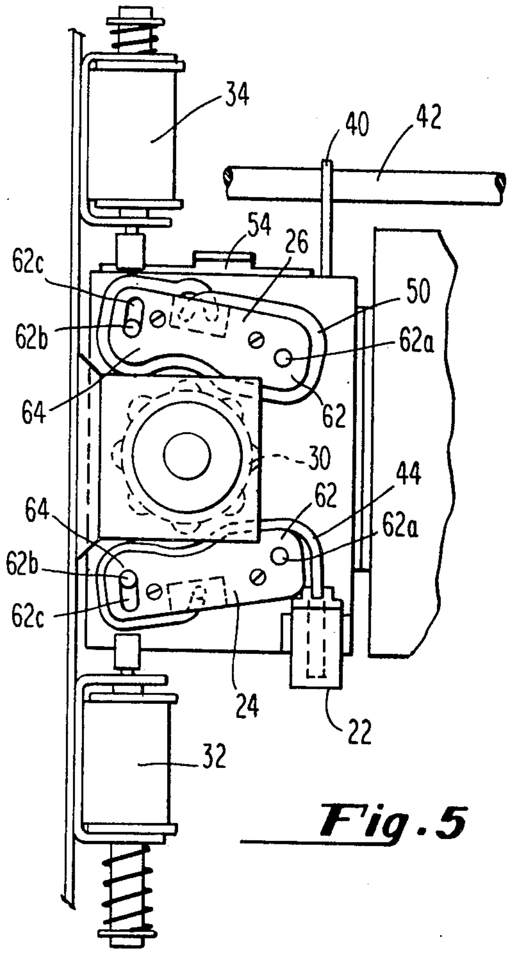
Fig. 5
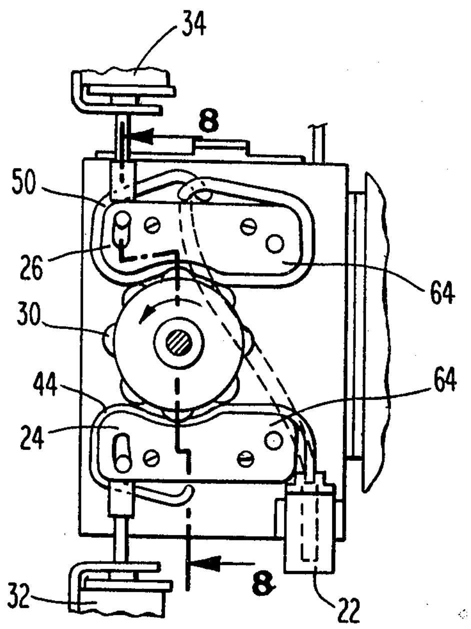
Fig. 6
Fig. 4
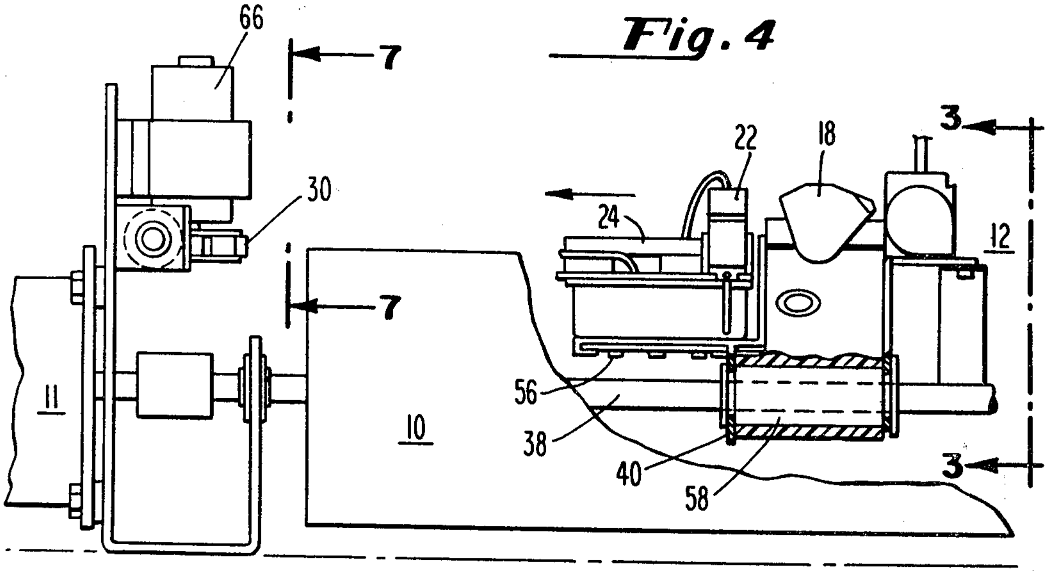

METHOD AND APPARATUS FOR USING A DISPOSABLE INK JET ASSEMBLY IN A FACSIMILE SYSTEM AND THE LIKE

FIELD OF THE INVENTION

This invention relates to a facsimile system for reproducing dark/light variations in a remotely located document using an ink jet. This invention also relates to the use of an ink jet in other systems.

BACKGROUND OF THE INVENTION

Ink jet printing has been suggested for use in facsimile systems wherein a facsimile receiver is adapted to receive a signal, typically over a communications link such as a telephone line, and print out a copy or facsimile of a document which is being scanned at a facsimile transmitter in a remote location. However, in most facsimile receivers and transceivers in commercial use today, ink jets are not employed. Rather, these facsimile receivers employ electrosensitive paper used in conjunction with a stylus which may be undesirable since the paper itself is specially treated and therefore somewhat expensive. Moreover, the paper of this type can produce unpleasant odors during marking.

Despite the disadvantages of electrosensitive paper, marking by ink jet has not yet achieved commercial acceptance in facsimile applications. One possible explanation for the failure of ink jets to assume commercial importance in facsimile applications is the difficulty associated with maintenance of the ink jet and related apparatus by relatively unskilled operators or attendants. More particularly, any ink jet apparatus necessarily requires a replenishing of the ink supply. Such replenishing in various ink jet printers has required an operator to disconnect the supply from the ink jet and replace the supply. The ink jet itself which is typically rather expensive remains permanently mounted on the scanning head of the receiver so as to assure proper drop placement.

Another possible reason for the failure of the ink jet to be accepted in facsimile systems is the requirement that the ink jet be ocassionally purged to remove dried ink or other debris from the orifice or nozzle of the ink jet. Since the orifice or nozzle of the ink jet is extremely small and its size is of the utmost importance in the formation of ink droplets which emerge from the jet, it will be readily appreciated that the orifice must be kept clear of any debris which might interfere with that drop forming function. It will further be appreciated that providing this purging function complicates the ink jet system which can create a further opportunity for operator-induced failure of an ink jet system if the operator is required to manipulate purging apparatus.

In ink jets of the demand or impulse type, it is also necessary to provide apparatus for priming the ink jet, i.e., in effect pumping a quantity of ink to a chamber so as to assure that ink will be present for ejection through the droplet forming orifice when a transducer is energized on demand. The priming apparatus which may be similar to the purging apparatus in an impulse ink jet will similarly complicate the apparatus and can create potential operator difficulties in attending to the ink jet apparatus.

In U.S. Pat. No. 3,961,337—Jung et al, an ink jet printer of the continuous type is disclosed wherein it is suggested that the ink supply as well as the ink jet may be replaced when it is time to replenish the ink supply. As disclosed therein, the ink jet is mounted on a movable head and spaced a distance from a stationary ink reservoir or supply which is connected to the ink jet by a hose. As a consequence, replacement of the ink jet and the ink supply requires the operator to remove the ink jet and also remove the separate ink supply. The Jung printer also employs a catcher and deflection plates which remain permanently mounted on the head. Assuming the operator is able to perform this chore, the operator must then accurately mount a replacement ink jet jet on the movable head in alignment with the permanently mounted catcher and deflection plates and also mount the ink supply in its stationary location. Moreover, the operator must couple the ink supply system to the associated pumping mechanism. Such an apparatus has not found commercial acceptance in a facsimile system.

OBJECTS OF THE INVENTION

It is an object of this invention to provide a improved ink jet printing apparatus for use in a facsimile system and the like.

It is also an object of this invention to provide an improved ink jet apparatus for use in a facsimile system and the like which is reliable.

It is also an object of this invention to provide an improved ink jet apparatus for use in a facsimile system and the like which may be attended by one having limited skill in the art.

It is a still further object of this invention to provide an improved ink jet printing apparatus for use in a facsimile system and the like which is inexpensive.

SUMMARY OF THE INVENTION

The foregoing objects and others may be achieved in the preferred embodiment of the invention which comprises a facsimile system including copy medium support means for supporting a copy medium during scanning and scanning head means movable with respect to the support means so as to create a relative scanning motion between the head and the support means. Demodulator means demodulate signals representing dark/light variations in a document, control means generate control signals used for marking on the copy medium so as to reproduce the dark/light variations. A disposable ink jet system comprising an ink jet, an ink reservoir and means for coupling the jet to the reservoir are supported on the head means and movable with respect to the copy medium support means. Ink jet mounting means couple the ink jet system including the ink jet and the reservoir to the head so as to permit removal and mounting of the ink jet means on the head.

In accordance with one important aspect of the invention, the ink jet is mounted on and carried by the reservoir.

In accordance with another important aspect of the invention, the ink jet system further comprises catcher means located adjacent the ink jet for collecting ink leaving the jet. The catcher means is also mounted on and carried by the reservoir.

In accordance with another important aspect of the invention, the reservoir includes a first section for storing ink prior to reaching the ink jet and a second section coupled to the catcher for storing ink entering the catcher from the ink jet. The reservoir may include a movable member separating the first section from the second section.

In accordance with another important aspect of the invention, the ink jet system may include means for priming and/or purging the ink jet which is mounted on a reservoir. Means are also provided for producing a subatmospheric pressure at the catcher so as to draw ink into the catcher. This subatmospheric pressure producing means is also carried by the reservoir.

BRIEF DESCRIPTION OF THE DRAWINGS

The invention will be better understood if reference is made to the accompanying drawings in which:

FIG. 4 is a side view of a portion of the facsimile apparatus of FIG. 1;

FIG. 5 is an enlarged plan view of a portion of the apparatus shown in FIG. 1, but with the head in the position assumed when the machine is between copies;

FIG. 6 is similar to FIG. 5, but in which the priming and vacuum pumps are shown in an energized position;

DETAILED DESCRIPTION OF A PREFERRED EMBODIMENT

Figure 1:
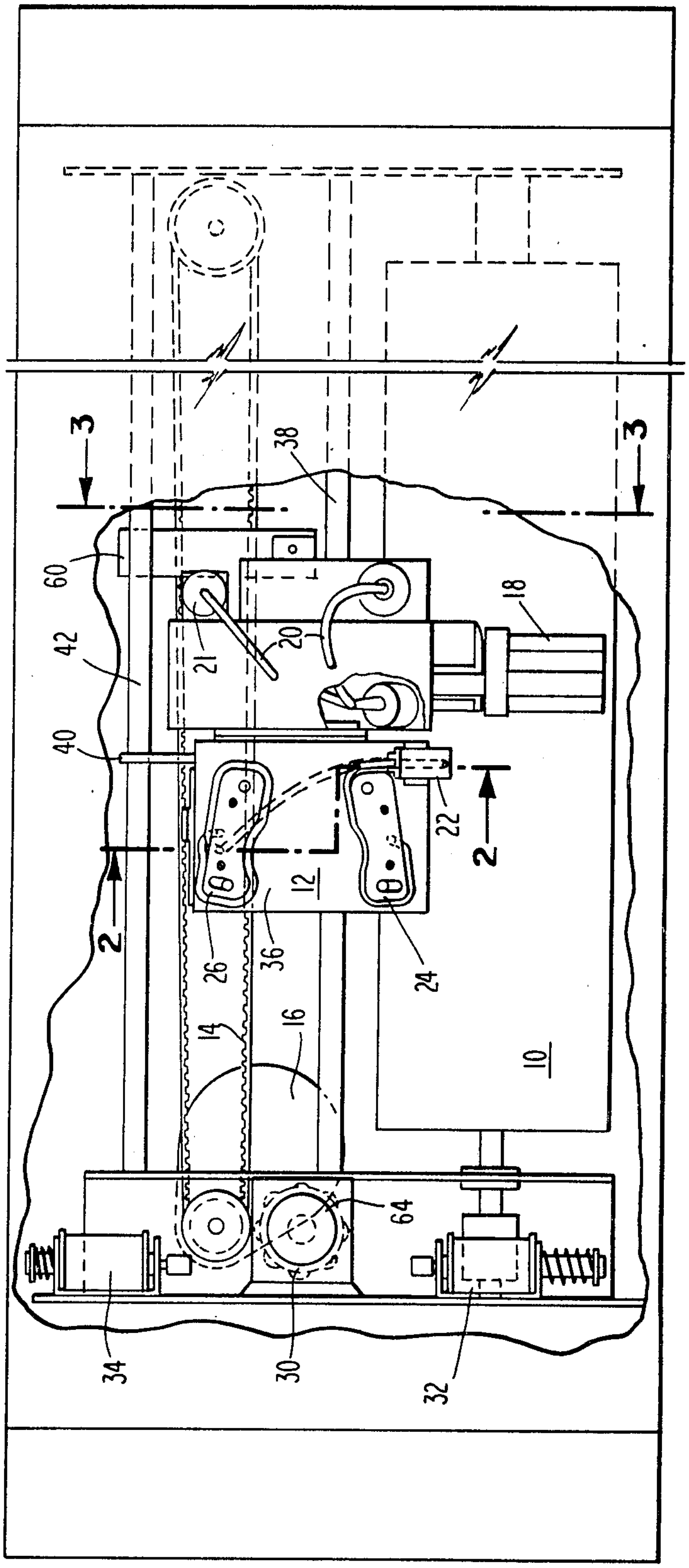
FIG. 1 represents an overall plan view of a facsimile transceiver comprising disposable ink jet apparatus according to the invention.

Referring now to FIG. 1, an overall plan view is shown of a facsimile transceiver comprising ink jet apparatus embodying the invention. In broad terms, the facsimile transceiver typically comprises a drum such as shown at 10 in FIG. 1 which is rotated by a motor 11 shown in FIG. 4 while a read/write head generally indicated at 12 moves or scans in a direction parallel to the axis of the drum thus covering the whole expanse of a copy medium or a piece of paper supported by or wrapped around the drum 10. In the embodiment shown, the head 12 is moved axially with respect to the drum 10 by means of a toothed belt 14 driven by a motor 16. The head 12 may be attached to the belt by a clamp which will be subsequently described.

The head 12 includes a knob 18 which controls the head function or mode; i.e., reading or writing. In the reading mode, fiber optics 20 provide a source of illumination for a document and pick up dark/light variations in the document. The dark/light variations in the document are used to generate signals which are modulated and transmitted to a remote receiver at a distance.

In accordance with this invention, the stylus of the prior art facsimile units has been replaced by a disposable ink jet 22 which is actually carried by a reservoir 36 on a carrier 23. The ink jet 22 is supplied with ink for priming and purging purposes by a first pump 24. In accordance with the invention of copending application Ser. No. 203,584 filed Nov. 3, 1980, U.S. Pat. No. 4,359,744, the pump 24 is of the peristaltic type. The ink jet apparatus is additionally provided with a second peristaltic pump 26 for providing subatmospheric pressure in the vicinity of the jet at start up of the unit, so as to provide a catcher for ink including any dust, dried ink or other debris which may be in the vicinity of the orifice of the jet 22. In accordance with one important aspect of the invention, both peristaltic pumps 24 and 26 are driven by a single motive means in the form of roller wheel 30 when the head 12 is at the far left. In accordance with copending application Ser. No. 203,589, filed Nov. 3, 1980, U.S. Pat. No. 4,333,088 the peristaltic pumps 24 and 26 are individually actuated by means of solenoids 32 and 34, respectively as later described in more detail. In accordance with this invention, the pumps 24 and 26 are mounted on and carried by the reservoir 36.

Figure 2:
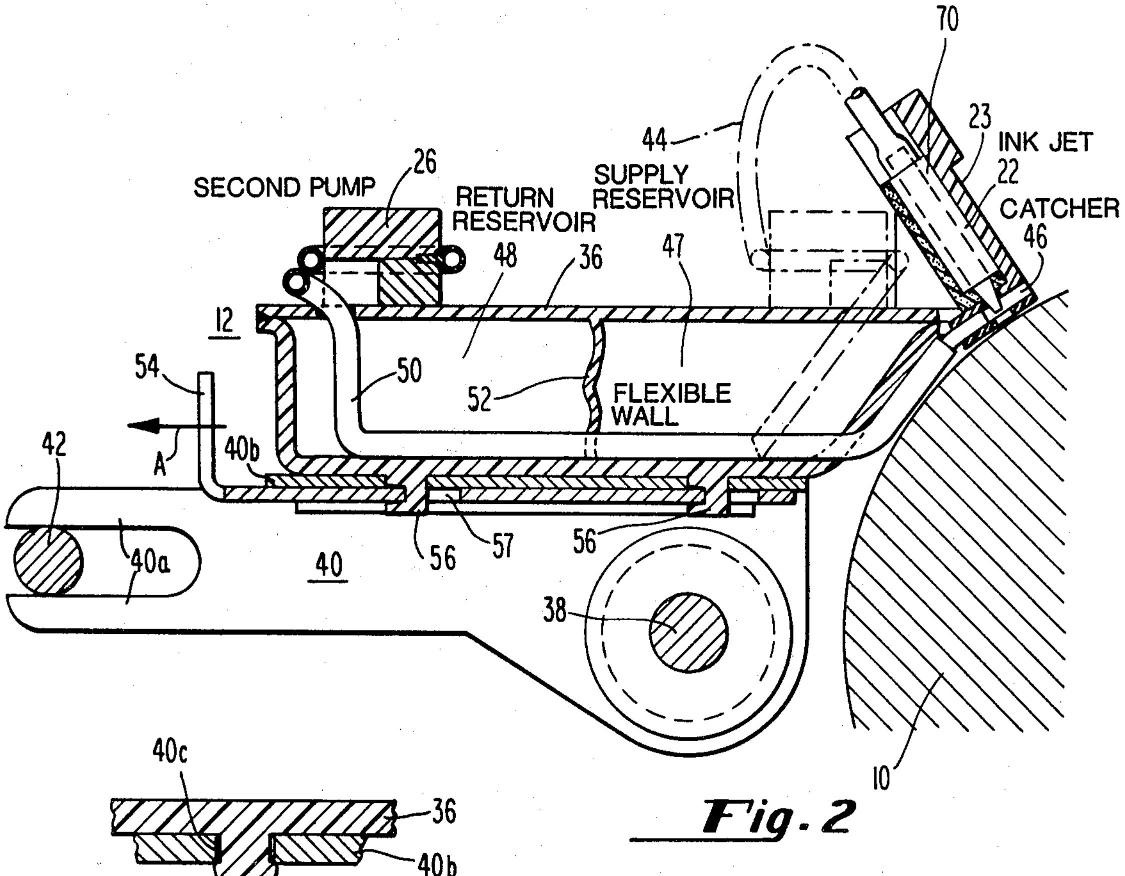
FIG. 2 is a cross-section of the portion of the facsimile apparatus shown in FIG. 1 taken along the line 2—2 of FIG. 1.

Referring now to FIG. 2, the ink jet apparatus according to the invention is shown in more detail. There, it will be observed, the ink jet 22 is in close proximity to a rotating drum 10 to which a copy medium may be attached for purposes of making a copy. The head 12 may move back and forth with respect to the drum 10 on a rod 38 and the distance of the jet 22 from the drum 10 may be controlled by means of a yoke 40*a* interacting with a second guide rod 42 thus allowing the bracket 40 on which the head 12 is mounted to pivot around the rod 38. When it is desired to begin operation of the ink jet 22, the pump may be energized, causing ink to travel through coupling means comprising a tube 44 to ink jet 22. Thereafter, the thus-primed ink jet will remain full of ink by means of capillary action. The same operation for a longer duration will also tend to purge any foreign matter from the jet 22. The pump 24 therefore need only be energized periodically, e.g., at the beginning of each document transmission.

In accordance with copending application Ser. No. 203,582 filed Nov. 3, 1980 a vacuum region or catcher 46 is provided in the vicinity of and adjacent the orifice of the jet 22 and subatmospheric pressure is created by means of the second pump 26. In this way, any extra ink or debris expelled from the ink jet 22 during the priming and purging operation described above will be collected through coupling means comprising a second tube 50 and can be returned to a second or return part of the reservoir 48. In accordance with this invention, the vacuum region 46 is actually carried by the reservoir 36.

It will therefore be appreciated that, in accordance with this invention, the entire ink jet apparatus including the ink jet 22, the tubes 44 and 50 which form part of the pumps 24 and 26 as well as the vacuum region or catcher 46 are mounted on the reservoir 36 and are therefore disposable as a unit with the reservoir 36.

In further accordance with this, a first or supply section 47 of the reservoir 36 is separated from a second or return section 48 by a wall 52. The wall or membrane may be movable or flexible so as to allow an increase in the supply section 47 to compensate for a decrease in the return section 48 and vice versa. This reduces the chances that air bubbles will form in the ink supply systems so as to assure proper operation of the jet. Note that the wall 52 is relatively flexible as compared with the relatively rigid container of the reservoir 36.

In accordance with one very important feature of the invention, the reservoir 36 is itself carried by the head 12 so as to permit latched mounting and removing of the reservoir 36 from the head 12. This is accomplished by providing a plurality of notched stubs 56 which may be formed integrally with the bottom of the reservoir 36 and adapted to interact with a slidable bracket 54 which, in turn, is held in place by a flange 40*b* of the bracket 40. When the bracket 54 is moved in a direction indicated by an arrow A, opening 57 in the slidable bracket 54 will release the notched stubs 56 so as to permit removal of the reservoir 36. During mounting, the bracket 54 is slid in the opposite direction so as to lock the notched stubs 56 in place. This is of course of the utmost importance to assure that a reservoir 36 and hence the ink jet 22 which is mounted on and carried by the reservoir 36 are properly located with respect to the drum 10 so as to assure proper drop placement.

Figure 2A:
FIG. 2*a* is a cross-section of a portion of a facsimile apparatus representing an alternative embodiment of the invention.

An alternative means to permit mounting and removing of the reservoir 36 from the head 12 is shown in FIG. 2a. Stubs 58 are formed integrally with the reservoir 36 and are adapted to form a force fit in openings 40c with the bracket 40b. The stubs 58 which have slightly enlarged heads as compared with the openings 40c may then be snapped into and out of the bracket 40b without movement of the type shown in FIG. 2 so as to permit the reservoir 36 of the ink jet apparatus associated therewith to be mounted and removed on the head 12 as a unit.

In accordance with another important aspect of the invention, the ink jet apparatus must be relatively inexpensive so as to permit disposability. In this regard, the ink jet 22 may comprise a glass tube which forms a chamber encased or surrounded with a concentric transducer of piezoelectric material 70. The tubes 44 and 50 may comprise materials such as rubber. The reservoir 36 proper may comprise materials such as a plastic and preferably polypropylene. The exterior wall 72 of the reservoir 36 may comprise a plastic with polypropylene also being preferred. The flexible membrane 52 may comprise an elastomer such as rubber. It will of course be appreciate that other materials may be utilized which are sufficiently inexpensive so as to permit disposability of the entire ink jet system.

Although no electrical connections to the transducer 70 have been disclosed, it will be appreciated that such electrical connections may be provided on the bottom of the reservoir 36 such that the connection of the transducer 70 is essentially automatic when mounting the reservoir 36.

Figure 3:
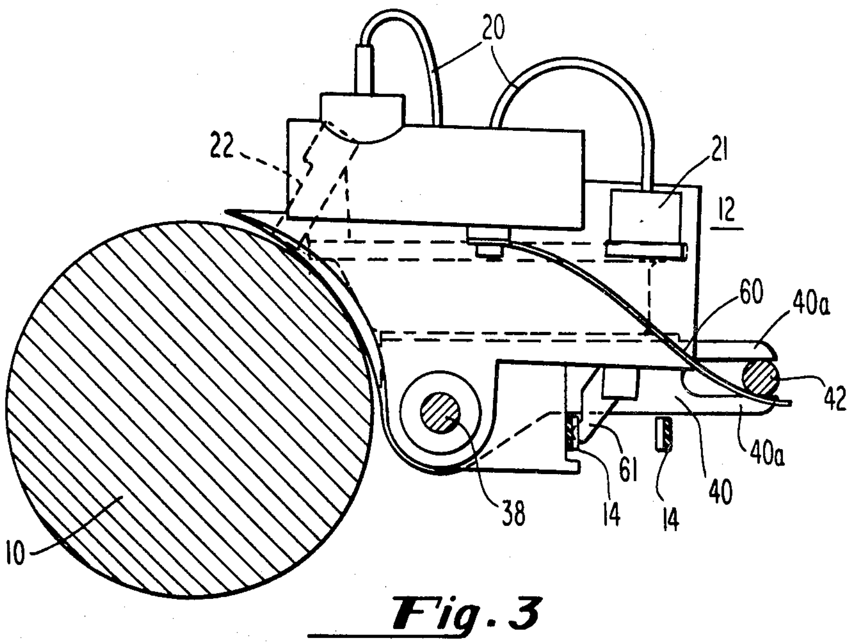
FIG. 3 is another cross-sectional view of a portion of the facsimile apparatus of FIG. 1 taken along the line 3—3 of FIG. 3.

Referring now to FIG. 3, certain additional details of the apparatus of the invention are shown. Many of details shown in FIG. 3 are disclosed in U.S. Pat. No. 3,956,587 incorporated herein by reference. Specifically, FIG. 3 shows fiber optics 20 which are used for transmitting illumination onto a region of the medium being scanned (when the facsimile transceiver is used for transmission purposes) and a second fiber optic used in combination with a photodetector 21 to pick-up dark/light variations of the document to be copied. Also shown in FIG. 3 is the rod 38 on which the read/write head 12 moves, the rod 42 which locates the angular position of the read/write head 12 with respect to the drum and a leaf spring 60 which serves to keep the read/write head properly positioned with respect to the drum. The belt 14 used to drive the read/write head back and forth with respect to the drum 10 is also shown in FIG. 3 as is the clamp 61 used to secure the read/write head to the belt; the ink jet 22 is shown in phantom.

FIGS. 4, 5 and 6 show additional details of a preferred embodiment of the invention which is more fully disclosed in the aforesaid copending applications Ser. Nos. 203,584 and 203,589 which are incorporated herein by reference. In each, the ink jet 22 appears connected to the two pumps 24 and 26 respectively. As discussed above, in the preferred embodiment, these pumps are peristaltic pumps which are of the type wherein progressive compression of a resilient tube is used to generate variations in pressure within the tube which can be used for pumping. In the preferred embodiment, the first pump 24 is activated to force ink through the ink jet 22 prior to printing so as to prime and purge the ink jet 22 and a second pump 26 is activated to provide a vacuum in the vicinity of the orifice of the jet 22 so as to collect ink including any dust or debris. As shown perhaps most clearly in FIGS. 5 and 6, the roller wheel 30 is used to compress the tubes of the pumps 24 and 26 against blocks 64 when the head 12 is in the left hand-most position. The wheel 30 which comprises a plurality of rollers around the periphery thereof is rotated as shown in FIG. 6 to provide progressive compression of the tubes, causing the desired pumping action. The two pumps are shown as comprising tube blocks 64 around which the tubes are wrapped which may be pivoted, under the action of solenoids 32 and 34, to cause the tube to be compressed by the rollers of the wheel 30. In this way, the two pumps are individually controllable. When a motor 66 (FIG. 4) is energized, it rotates the roller wheels 30. Then if either of the solenoids 32 or 34 are energized, the pivoted blocks 64 are forced into the wheel thus compressing the tubes 44 and 50. The preferred sequence of operations is energize the solenoid 34, and thus activate the pump 26, thus providing subatmospheric pressure in the vicinity of the orifice of the jet 22, and to energize solenoid 32 and hence activate pump 24 to force ink from the reservoir 36 through the ink jet 22. Any ink thus ejected from the jet 22 would be collected, along with any dust or debris in the pump 26 and returned to the part 47 of the reservoir 48 (FIG. 2). The pump 24 is then deactivated by deenergizing the solenoid 32 and the pump 26 is deactivated by deenergizing the solenoid 34.

Figure 7:
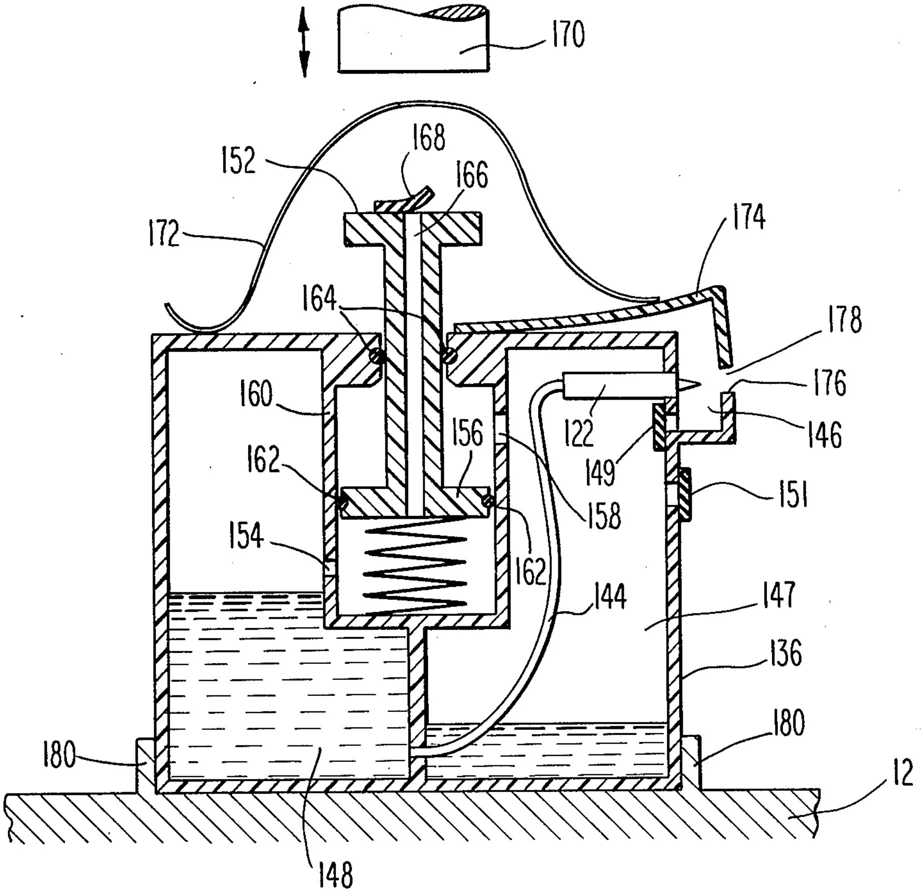
FIG.7 is a sectional view of an alternative embodiment of the invention.

Referring to FIG. 7, another embodiment of the invention is shown comprising another reservoir 136 mounted on the head 12. In accordance with this invention, the reservoir 136 carries an ink jet 122 which is supplied by ink through a hose 144 extending into an ink supply section 148. In addition, the reservoir 136 includes an ink return section 147 which is coupled to a catcher 146 which communicates with the section 147 through a flapper valve 149. Another flapper valve 151 vents the return section 147.

In addition to the ink jet 122, the reservoir 136 carries pump means in the form of a plunger 152 which communicates with the ink supply section 148 through an opening 154 located beneath a piston 156 of the plunger 152. The ink return section communicates with the plunger 152 through an opening 158. The piston 156 cooperates with the walls of a chamber 160 through which the openings 154 and 158 are located. A coil spring 162 is located beneath the piston 156 to return the piston 156 to the position shown after pressure has been removed from the plunger 152. It will be understood that moving the piston toward the opening 154 creates pressure within the ink supply section 148 to move ink to the jet 122 during priming and purging. Simultaneously, pressure is reduced within the return section 147 and the piston 156 moves downwardly so as to draw ink past the flapper valve 149 from the catcher 146. Note the use of seals 162 and 164 in conjunction with the piston 156 and the plunger 152 respectively. Note also an opening 166 extending through the plunger 152 and the piston 156 which serves to vent the ink supply section 148. The opening 166 is closed by a flapper valve 168 at the top of a plunger 152. In accordance with this invention, the entire pump provided by the plunger 152 is carried by the reservoir 136 which is carried by the head 12. As a consequence, the plunger 152 is permitted to move toward and away from single motive means 170 located immediately above the plunger 152 as the head moves. The motive means 170 may be positioned at the left-handmost portion of the facsimile apparatus in place of the wheel 30 shown in FIG. 1.

As also shown in FIG. 7, a leaf spring 172 is provided above the top of the plunger 152. The leaf spring 172 is coupled to a hinged cover 174. As the activating means 170 is drive downwardly, the leaf spring 172 is deflected downwardly until it contacts the top of the plunger 152. Simultaneously, a cover 174 is forced downwardly by the leaf spring 172 until it contacts a top 176 of the catcher 146 so as to form a closed chamber in front of the ink jet 122. Of course, when the leaf spring 172 is released and the cover 174 rises, an opening 178 is formed immediately in front of the ink jet 122 as shown in FIG. 7.

As also shown in FIG. 7, the head 12 may include guides 180. The reservoir 136 may be inserted between the guides 180 so as to properly locate the ink jet on the head 12 to assure proper drop placement. The guides 180 are designed so as to permit ease in mounting of the reservoir 136 on the head as well as ease in removal of the reservoir 136 from the head 12.

Figure 8:
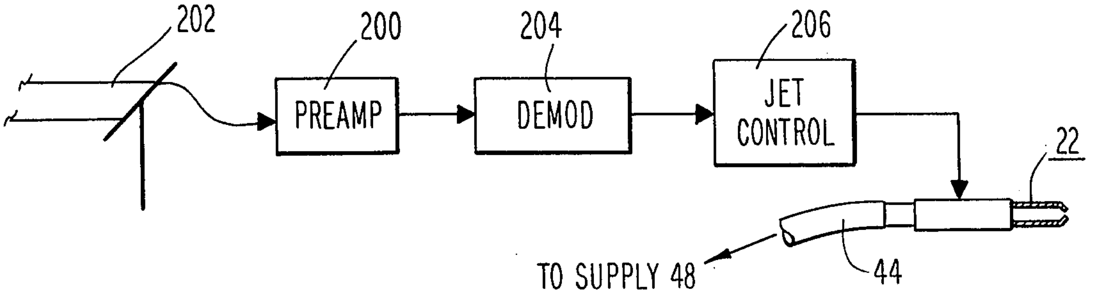
FIG. 8 is a block diagram of a facsimile receiver embodying this invention.

Referring to FIG. 8, the ink jet 22 as shown is coupled to a circuitry for controlling the ink jet. More particularly, FIG. 8 shows a preamplifier circuit 200 coupled to a communications link such as a telephone line 202. The output of the preamplifier is coupled to a demodulator or a decoder 204 of information bearing signals representing dark/light variations in a remotely located document. The output from the demodulator is coupled to a jet control signal generator 206 capable of generating print commands for the ink jet 22.

A number of the details concerning the peristaltic pumps 24 and 26 are disclosed in the aforesaid applications Ser. No. 203,589 filed Nov. 3, 1980 and this application is therefore incorporated herein by reference. In addition, details concerning the catcher 46 are disclosed in copending application Ser. No. 203,582 filed Nov. 3, 1980 which is also incorporated herein by reference.

While preferred embodiments of the invention have been shown and described, it will be understood that they are exemplary only, and that true spirit and scope of the invention, is set forth in the appended claims.

What is claimed is:

1. A facsimile system comprising:

copy medium support means for supporting a copy medium during scanning;

scanning head means movable with respect to said support means so as to create a relative scanning motion between said head and said support means;

a demodulator means for demodulating signals representing dark/light variations in a document;

an ink jet for ejecting droplets of ink;

means for generating control signals coupled to said ink jet so as to control the projection of droplets from said ink jet toward said copy medium for reproducing said dark/light variations;

a disposable ink jet system comprising an ink reservoir, said ink jet being mounted on and carried by said reservoir;

means for priming and purging said ink jet mounted on and carried by said reservoir;

means coupling said ink jet to said reservoir said ink jet system including said reservoir being supported on said head means and movable with respect to said support means; and means for permitting mounting and removing of said ink jet system including said reservoir and said ink jet.

2. The facsimile system of claim 1 wherein said ink jet system further comprises catcher means located adjacent said ink jet for collecting ink leaving said jet.

3. The facsimile system of claim 2 wherein said ink jet and said catcher means are mounted on and carried by said reservoir.

4. The facsimile system of claim 3 wherein said reservoir includes the first supply section for storing ink prior to reaching said ink jet and a second return section coupled to said catcher for storing ink entering said catcher from said ink jet.

5. The facsimile system of claim 4 wherein said reservoir includes a movable member between said first supply section and said second supply section.

6. The facsimile system of claim 3 wherein said reservoir includes a first supply section for storing ink prior to reaching said ink jet and a second return section coupled to said catcher for storing ink entering said catcher from said ink jet.

7. A disposable ink jet apparatus for use in a facsimile system comprising:

an ink jet reservoir;

an ink jet mounted on and carried by said reservoir;

means for priming and purging said ink jet mounted on and supported by said reservoir; and means for coupling said ink jet to said reservoir.

8. The disposable ink jet apparatus of claim 7 further comprising ink catcher means mounted on and supported by said reservoir.

9. A disposable ink jet apparatus of claim 7 comprising catcher means mounted on and supported by said reservoir and means for creating a subatmospheric pressure at said catcher.

10. The disposable ink jet apparatus of claim 9 further comprising pump means for forcing the ink from said ink jet into said catcher.

11. The disposable ink jet apparatus of claim 10 wherein said pump means and said means for creating a subatmospheric pressure at said catcher comprises single motive means.

* * * * *